(12) United States Patent
Wakui

(10) Patent No.: US 8,792,136 B2
(45) Date of Patent: Jul. 29, 2014

(54) PROCESSING CONDITION SELECTING APPARATUS, PROCESSING CONDITION SELECTING METHOD, AND STORAGE MEDIUM

(75) Inventor: Takashi Wakui, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 176 days.

(21) Appl. No.: 13/439,564

(22) Filed: Apr. 4, 2012

(65) Prior Publication Data

US 2012/0257256 A1 Oct. 11, 2012

(30) Foreign Application Priority Data

Apr. 5, 2011 (JP) .................................. 2011-083464

(51) Int. Cl.
*H04N 1/405* (2006.01)
*G06K 15/02* (2006.01)

(52) U.S. Cl.
USPC ........................................... 358/3.06; 358/3.27

(58) Field of Classification Search
USPC .............. 358/3.06, 1.15, 1.11, 1.13, 3.27, 2.1
See application file for complete search history.

(56) References Cited

U.S. PATENT DOCUMENTS

| 6,674,546 B1 | 1/2004 | Nakahara |
| 6,906,825 B1 | 6/2005 | Nakahara et al. |
| 7,085,000 B2 * | 8/2006 | Coleman ...................... 358/1.15 |

FOREIGN PATENT DOCUMENTS

| JP | 10-032712 A | 2/1998 |
| JP | 2000-196885 A | 7/2000 |
| JP | 2010-136232 A | 6/2010 |
| JP | 2010-239668 A | 10/2010 |

* cited by examiner

*Primary Examiner* — Charlotte M Baker
(74) *Attorney, Agent, or Firm* — Birch, Stewart, Kolasch & Birch, LLP.

(57) ABSTRACT

A processing condition selecting apparatus, a processing condition selecting method, and a storage medium storing a program therein serve to evaluate the production aptitude of a print under a signal processing condition, based on image forming information with respect to the print and prescribed evaluation criteria, to thereby generate a display image visually representing the production aptitude of the print that has been evaluated.

11 Claims, 13 Drawing Sheets

PROCESSING CONDITION SELECTING APPARATUS, PROCESSING CONDITION SELECTING METHOD, AND STORAGE MEDIUM

CROSS-REFERENCE TO RELATED APPLICATION

This application is based upon and claims the benefit of priority from Japanese Patent Application No. 2011-083464 filed on Apr. 5, 2011, of which the contents are incorporated herein by reference.

BACKGROUND OF THE INVENTION

1. Field of the Invention

The present invention relates to a processing condition selecting apparatus, a processing condition selecting method, and a storage medium storing a program for selecting a single signal processing condition from a plurality of signal processing conditions representative of different dot distribution characteristics, and for instructing an image forming apparatus, which is capable of producing a print by forming an image on a recording medium, to carry out a halftone process depending on the selected signal processing condition.

2. Description of the Related Art

With significant advances in inkjet technology in recent years, it is becoming possible for inkjet image forming devices to produce large color prints of high quality at high speeds. Inkjet image forming devices are widely used particularly in sign and display applications, and are applicable to, for example, prints on POP (point of purchase) posters, wall posters, outdoor advertisements, billboards, etc. Inkjet image forming devices are capable of producing prints by forming a number of ink dots on a print medium, by applying droplets of different colored inks, e.g., C, M, Y, K inks, to the print medium.

Inkjet image forming devices perform a halftone process on an image signal representative of multiple gradation levels to convert the image signal into a discharge control signal, which represents dot on/off information and dot size information, for controlling the discharge of ink droplets. There have been proposed various image processing technologies for selecting an appropriate halftone process to increase the quality, particularly the image quality, of prints.

Japanese Laid-Open Patent Publication No. 2010-239668 discloses an apparatus for and a method of performing a halftone process using a threshold matrix, which has an anisotropic threshold array characteristic, in order to reduce banding in a scanning direction of relatively low output accuracy in an image forming device with anisotropic output accuracy.

Japanese Laid-Open Patent Publication No. 2000-196885 and Japanese Laid-Open Patent Publication No. 2010-136232 disclose a method of and an apparatus for performing a halftone process by selecting either one of a resolution-oriented threshold matrix and a gradation-oriented threshold matrix based on local characteristics of an input image signal. For example, the threshold matrix is resolution-oriented for an image area having a large gradation change, such as a character area, a line image area, or the like, and the threshold matrix is gradation-oriented for an image area having a small gradation change, such as a photographic image area or the like.

Japanese Laid-Open Patent Publication No. 10-032712 discloses an apparatus for and a method of performing a halftone process by selecting a dithering process for an image area such as a graph, a computer graphic (hereinafter referred to as a "CG") image, or the like, or an error diffusion process for an image area such as a natural image or the like.

SUMMARY OF THE INVENTION

Printing companies have demands for optimization of an entire print production system for facilitating efficient company management. For example, companies may want to select an optimum halftone process in view of not only the image quality of prints to be produced by the print production system, but also the running cost of the print production system and the time required to produce prints with the print production system. According to the apparatus and methods disclosed in Japanese Laid-Open Patent Publication No. 2010-239668, Japanese Laid-Open Patent Publication No. 2000-196885, Japanese Laid-Open Patent Publication No. 2010-136232, and Japanese Laid-Open Patent Publication No. 10-032712, however, the operator of the print production system is unable to select a halftone process freely. Even if the operator can select a halftone process freely, the operator will be troubled over which type of halftone process should be selected, unless the operator is well aware of the processing characteristics of available halftone processes.

It is an object of the present invention to provide a processing condition selecting apparatus, a processing condition selecting method, and a storage medium storing a program for enabling an operator to select a halftone process suitable for a print, even if the operator is not familiar with the processing characteristics of available halftone processes.

According to the present invention, there is provided a processing condition selecting apparatus for selecting a single signal processing condition from a plurality of signal processing conditions representing different dot distribution characteristics, and instructing an image forming apparatus, which is capable of producing a print by forming an image on a recording medium, to carry out a halftone process depending on the selected signal processing condition.

The processing condition selecting apparatus comprises an image forming information acquirer for acquiring image forming information with respect to the print, a production aptitude evaluator for evaluating a production aptitude of the print under the signal processing condition, based on the image forming information acquired by the image forming information acquirer and prescribed evaluation criteria, and a display image generator for generating a display image visually representing the production aptitude of the print that has been evaluated by the production aptitude evaluator.

As described above, the processing condition selecting apparatus includes the production aptitude evaluator for evaluating a production aptitude of the print under the signal processing condition, based on the image forming information with respect to the print and the prescribed evaluation criteria, and the display image generator for generating a display image visually representing the production aptitude of the print that has been evaluated by the production aptitude evaluator. Consequently, even if the operator of the processing condition selecting apparatus is not well aware of the processing characteristics of available halftone processes, the operator can easily grasp the processing characteristics of available halftone processes, and can select one of the halftone processes that is suitable for the print, simply by observing the display image visually representing the production aptitude of the print.

Preferably, the prescribed evaluation criteria comprises a plurality of individual evaluation items including an evaluation item concerning at least one of the quality of the print, the cost required to produce the print, and the time required to produce the print.

The production aptitude evaluator preferably comprises an individual evaluation value calculator for calculating individual evaluation values of the print under the signal processing conditions based on the image forming information and the individual evaluation values, and a generalized evaluation value calculator for calculating a generalized evaluation value to evaluate the production aptitude of the print by weighting the individual evaluation values calculated by the individual evaluation value calculator, and adding the weighted individual evaluation values.

The display image generator preferably generates the display image to indicate, as a recommended signal processing condition, a signal processing condition that maximizes the generalized evaluation value calculated by the generalized evaluation value calculator.

The display image generator preferably generates the display image to include a radar chart image concerning the individual evaluation values.

The production aptitude evaluator preferably further comprises an evaluation weighting determiner for determining weighting values for the respective individual evaluation values, which are used by the generalized evaluation value calculator in order to calculate the generalized evaluation value.

The evaluation weighting determiner preferably determines the weighting values in response to an input signal from a user interface.

The processing condition selecting apparatus preferably further comprises a processing condition selector for selecting the single signal processing condition from the plurality of signal processing conditions.

The processing condition selecting apparatus preferably further comprises a display unit for displaying the display image generated by the display image generator.

According to the present invention, there is also provided a processing condition selecting method for selecting a single signal processing condition from a plurality of signal processing conditions representing different dot distribution characteristics, and for instructing an image forming apparatus, which is capable of producing a print by forming an image on a recording medium, to carry out a halftone process depending on the selected signal processing condition, the method comprising the steps of acquiring image forming information with respect to the print, evaluating a production aptitude of the print under the signal processing condition, based on the acquired image forming information and prescribed evaluation criteria, and generating a display image visually representing the production aptitude of the print that has been evaluated.

According to the present invention, there is further provided a storage medium storing therein a program for selecting a single signal processing condition from a plurality of signal processing conditions representing different dot distribution characteristics, and for instructing an image forming apparatus, which is capable of producing a print by forming an image on a recording medium, to carry out a halftone process depending on the selected signal processing condition, the program enabling a computer to function as an image forming information acquirer for acquiring image forming information with respect to the print, a production aptitude evaluator for evaluating a production aptitude of the print under the signal processing condition, based on the image forming information acquired by the image forming information acquirer and prescribed evaluation criteria, and a display image generator for generating a display image visually representing the production aptitude of the print that has been evaluated by the production aptitude evaluator.

With the processing condition selecting apparatus, the processing condition selecting method, and the storage medium according to the present invention, a production aptitude of the print under the signal processing condition is evaluated based on the image forming information with respect to the print and the prescribed evaluation criteria. Then, a display image visually representing the production aptitude of the print that has been evaluated is generated. Consequently, even if the operator of the processing condition selecting apparatus is not well aware of the processing characteristics of available halftone processes, the operator can easily grasp the processing characteristics of available halftone processes, and can select one of the halftone processes that is suitable for the print, simply by observing the display image visually representing the production aptitude of the print.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A processing condition selecting method according to a preferred embodiment of the present invention in relation to a processing condition selecting apparatus and a printing system, which carry out the processing condition selecting method, will be described in detail below with reference to the accompanying drawings. A process of forming an image may also be referred to as "printing".

Figure 1:
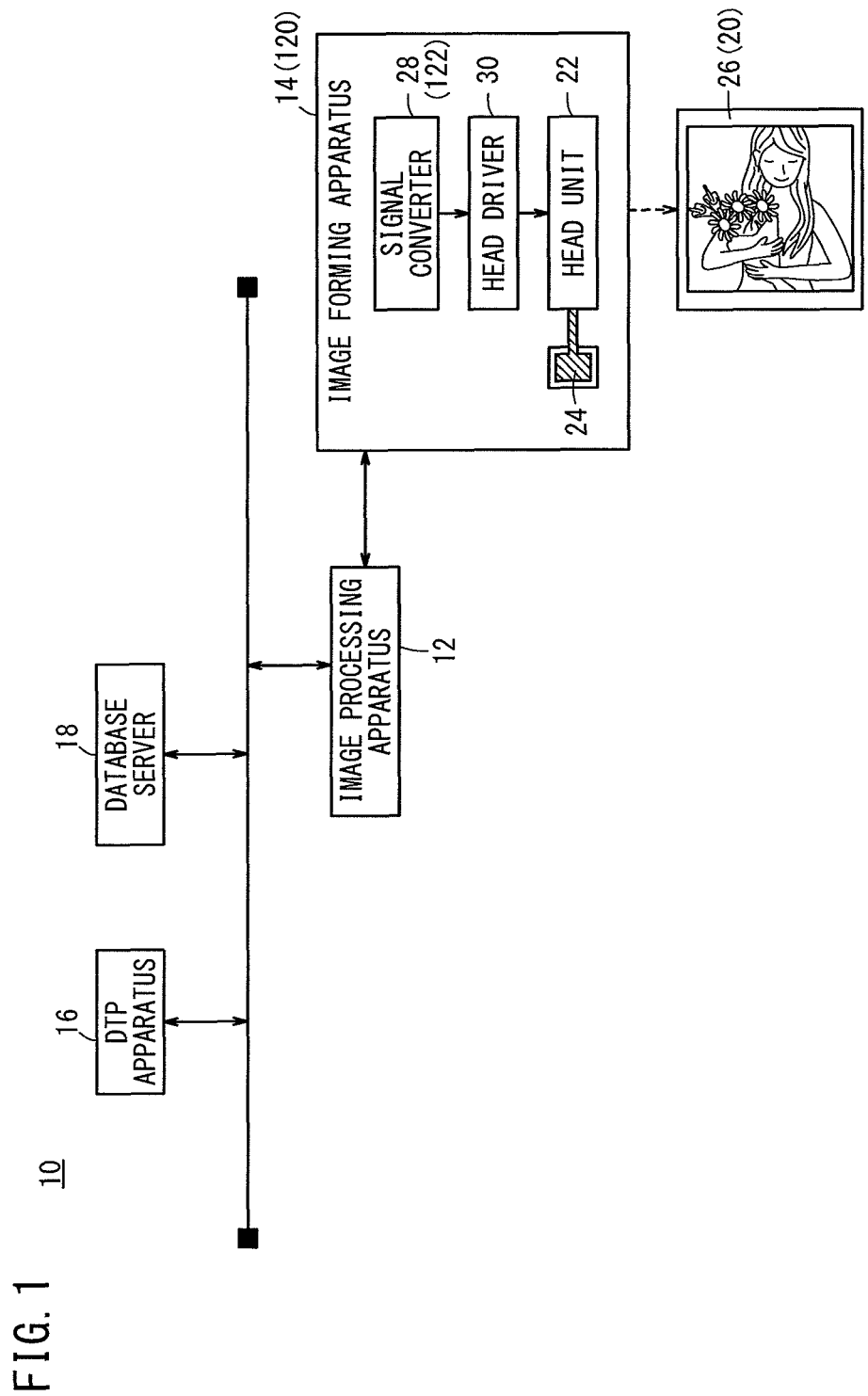
FIG. 1 is a block diagram of a printing system incorporating therein an image processing apparatus as a processing condition selecting apparatus according to an embodiment of the present invention.

FIG. 1 is a block diagram of a printing system 10 incorporating therein an image processing apparatus 12 as a processing condition selecting apparatus according to an embodiment of the present invention. As shown in FIG. 1, the printing system 10 basically includes, in addition to the image processing apparatus 12, an image forming apparatus 14, a DTP (desktop publishing) apparatus 16, and a database server 18. The image processing apparatus 12, the DTP apparatus 16, and the database server 18 are electrically connected to each other by a wired or wireless link.

The image processing apparatus 12 outputs an image signal, i.e., a device color signal or page description data, from an external apparatus to the image forming apparatus 14. The device color signal refers to a color signal defined by device-dependent data, and represents raster-format data, such as TIFF data, bitmap data, RAW data, or the like, having color channels in four colors (C, M, Y, K) or three colors (R, G, B). The device color signal supplied to the image forming apparatus 14 may represent unique format data with any desired header added thereto. The image processing apparatus 12 can select a signal processing condition (hereinafter also referred to as a "selected processing condition") from a plurality of signal processing conditions having different dot distribution characteristics, and instruct the image forming apparatus 14 to carry out a halftone process depending on the selected processing condition.

The term "dot distribution characteristics" refers not only to a two-dimensional distribution of dots arranged in place, which represents the density, phase, spatial frequency, etc., of dots, but also to various characteristics representative of the density of dots having different sizes, the ratio of distributed dot sizes, the number and types of color plates, etc.

The image forming apparatus 14 is electrically connected to the image processing apparatus 12 through a serial interface such as a USB (universal serial bus) cable, an IEEE1394 cable, an Ethernet (registered trademark) cable, a wireless network, or the like, or a parallel interface such as a Centronics cable.

The image forming apparatus 14 comprises an inkjet printer for forming an image on a roll sheet 20 (hereinafter referred to as a "sheet 20") as a recording medium while the sheet 20 is fed in a certain direction, with droplets of inks 24 propelled from a head unit 22, thereby producing a print 26. The sheet 20 has a base, which may comprise a paper medium such as synthetic paper, thick paper, aluminum-evaporated paper, or the like, a resin medium such as vinyl chloride, PET, or the like, or tarpaulin paper, or the like.

The image forming apparatus 14 includes, in addition to the head unit 22, a signal converter 28 for converting an image signal input from the image processing apparatus 12 (hereinafter referred to as an "input image signal") into a control signal for controlling the head unit 22, and a head driver 30 for controlling the head unit 22 to propel and eject ink droplets based on the control signal from the signal converter 28.

The head unit 22 may include an ink droplet propelling mechanism of any of various different types. For example, the head unit 22 may have an actuator in the form of a piezoelectric device, which serves as an ink droplet propelling mechanism that propels and ejects ink droplets in a case where the piezoelectric device is mechanically deformed based on the control signal. Alternatively, the head unit 22 may have a thermal jet mechanism, which serves as an ink droplet propelling mechanism that propels and ejects ink droplets under the pressure of air bubbles, which are generated in a case where the inks 24 are heated by a heater. The head unit 22 is not limited to a line head unit, but may be a multipass head unit that is reciprocally scanned transversely across the sheet 20 to form an image thereon.

The DTP apparatus 16 is capable of editing data of material (contents) made up of characters, figures, pictures, photos, etc. The DTP apparatus 16 generates electronic manuscripts in a page description language (hereinafter referred to as "PDL") by laying out the material data on each page. PDL refers to a language which is descriptive of image information including format information, positional information, color information (including density information), etc., of characters, figures, etc., in a "page" that serves as an output unit for printing, displaying, or the like. The DTP apparatus 16 performs a rasterizing process on electronic manuscripts described using PDL. The rasterizing process includes a data format converting process for converting PDL format data into raster format data, and a color converting process using an ICC (International Color Consortium) profile.

The database server 18 is an apparatus for managing data such as job tickets of electronic manuscripts, e.g., JDF (job definition format) files, color sample data, target profiles, or device profiles, which are suitable for the combination of the image forming apparatus 14 and the sheet 20.

Figure 2:
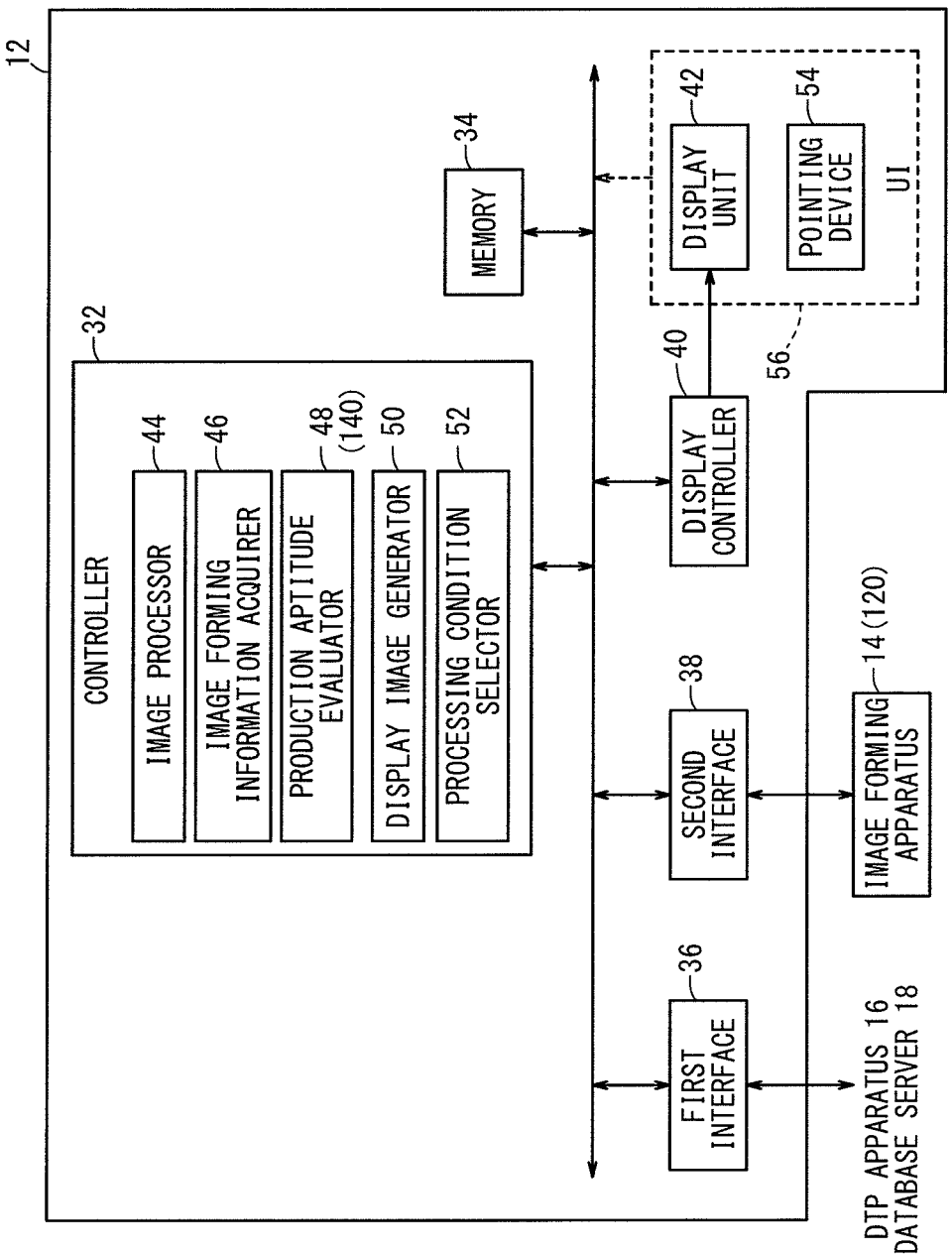
FIG. 2 is an electric block diagram of the image processing apparatus shown in FIG. 1.

FIG. 2 is an electric block diagram of the image processing apparatus 12 shown in FIG. 1.

As shown in FIG. 2, the image processing apparatus 12 basically includes a controller 32, a memory 34 (storage medium) 34, a first interface 36, a second interface 38, a display controller 40, and a display unit 42. The memory 34 stores a program therein for controlling the controller 32, so as to function as the processing condition selecting method according to the present embodiment.

The first interface 36 receives electric signals from various external apparatus. For example, the first interface 36 receives various data (device color signals, PDL data) edited and generated by the DTP apparatus 16, and also acquires various data, such as ICC profile data or the like, which are managed and saved by the database server 18. The second interface 38 sends electric signals to the external apparatus. The image processing apparatus 12 is capable of supplying input image signals produced according to various processing sequences and selected processing conditions (to be described later) to the image forming apparatus 14 via the second interface 38.

The controller 32, which comprises an information processor such as a CPU or the like, includes an image processor 44 having the same rasterizing function as the DTP apparatus 16 (see FIG. 1), an image forming information acquirer 46, a production aptitude evaluator 48, a display image generator 50, and a processing condition selector 52.

The image forming information acquirer 46 acquires image forming information from an external apparatus such as the image forming apparatus 14, the database server 18, or the like. Image forming information refers to various items of information relative to the print 26. Image forming information is generally classified into common information, which is independent of the type of image forming apparatus 14, and inherent information, which is dependent on the type of image forming apparatus 14.

Common information refers to, in addition to input image signals, ancillary information such as job tickets, image attributes, image feature quantities based on prescribed evaluation criteria, etc., for example. Image attributes include types of images such as documents, photographs (including portraits and landscapes), CG images, etc., for example. Image feature quantities include spatial frequencies, color distributions, statistical color values including average values, standard deviations, variances, etc., for example.

Inherent information refers to the type and output resolution of the image forming apparatus 14, medium information with respect to the sheet 20, the type, combination, and used amounts of inks 24, etc., for example. Inherent information may also refer to physical properties associated therewith, e.g., the gross level of the sheet 20, the patterns of dots in colors (dot colors, sizes, and shapes), the absorbed amounts, absorption rates, and fixed levels of inks 24.

The production aptitude evaluator 48 evaluates the production aptitude of the print 26 under an applied signal processing condition, based on the image forming information acquired by the image forming information acquirer 46 and the prescribed evaluation criteria. The prescribed evaluation criteria may include at least one individual evaluation item, and include at least one of the quality of images (hereinafter simply referred to as "image quality") of the print 26, the cost required to produce the print 26, and the time required to produce the print 26 (time of delivery). In other words, the production aptitude of the print 26 implies an aptitude judged from a comprehensive consideration of the image quality of the print 26, the cost required to produce the print 26, and the time required to produce the print 26.

The processing condition selector 52 extracts a plurality of candidates for signal processing conditions (hereinafter also referred to as "candidate processing conditions") which can be dealt with by the image forming apparatus 14. The processing condition selector 52 then selects one of the extracted candidate processing conditions (selected signal processing condition). The processing condition selector 52 may select one of the extracted candidate processing conditions based on the production aptitude evaluated by the production aptitude evaluator 48, or may select one of the extracted candidate processing conditions according to an instruction input by the operator.

The display image generator 50 generates images to be displayed on the display unit 42, or various images that serve as part of such images to be displayed on the display unit 42. The display image generator 50 also generates a result display screen 100 (display image, see FIG. 8) visually representing the production aptitude, which is evaluated by the production aptitude evaluator 48.

Figure 8:
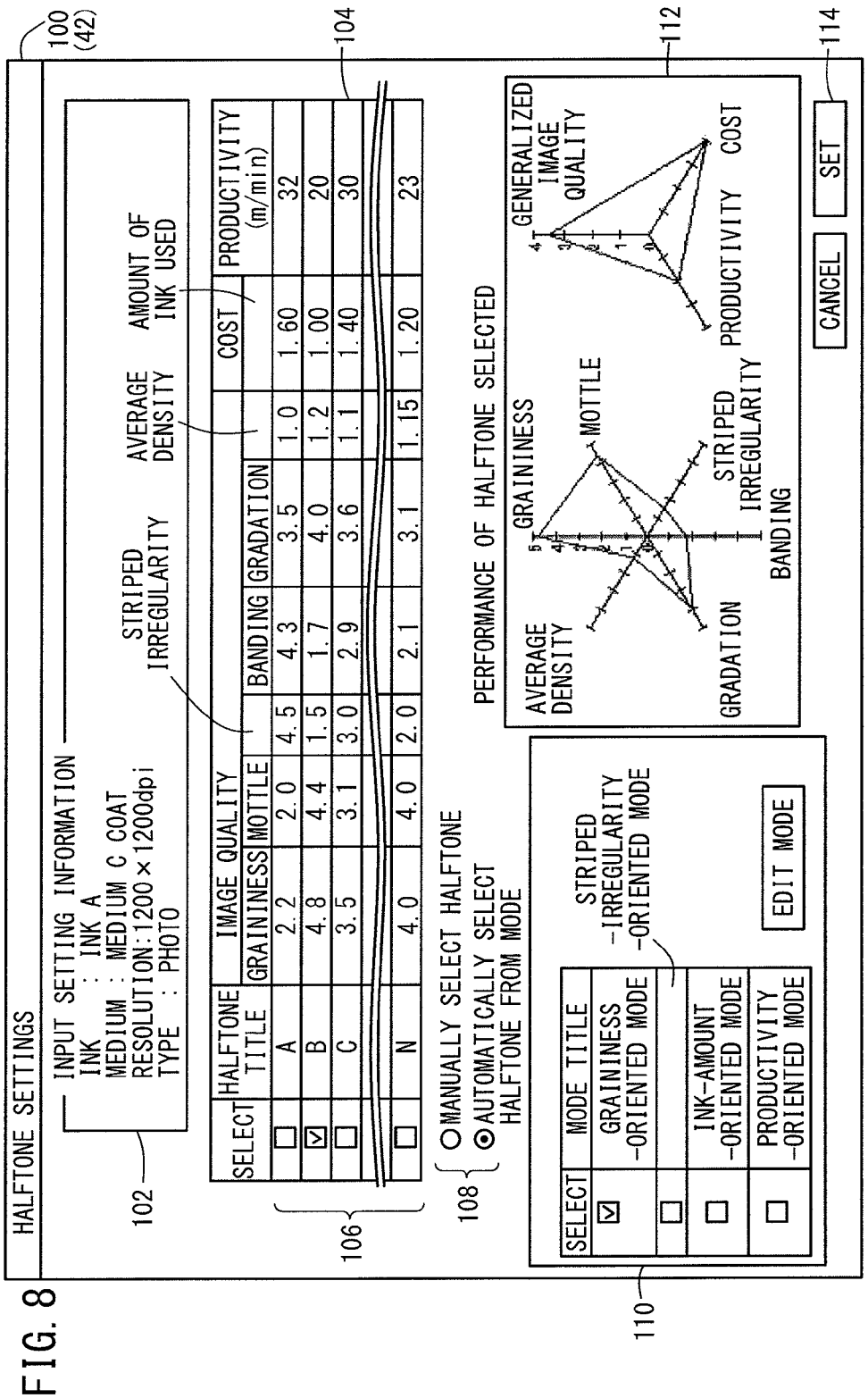
FIG. 8 is a view of a displayed image visually representing the production aptitude of a print that is evaluated.

The display controller 40 controls the display unit 42 via an interface (not shown) to display various screens, including the result display screen 100 shown in FIG. 8, which are generated by the display image generator 50. The display function of the display unit 42, and the input function of a pointing device 54 such as a mouse or the like jointly make up a user interface (UI) 56.

Figure 3:
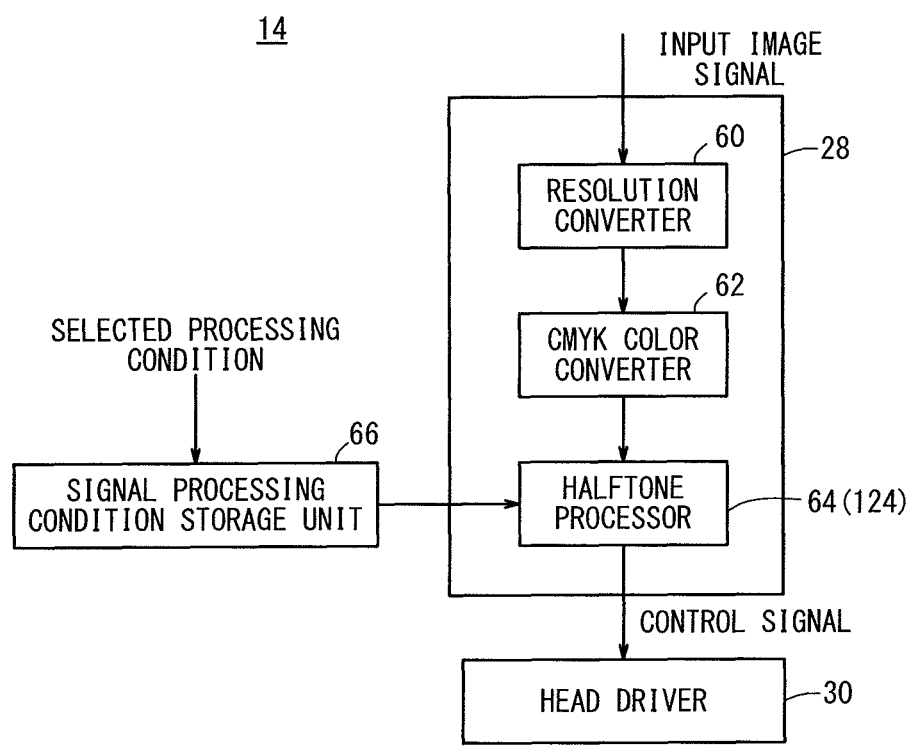
FIG. 3 is a block diagram showing a signal processing flow in a signal converter shown in FIG. 1.

FIG. 3 is a block diagram showing a signal processing flow in the signal converter 28 shown in FIG. 1. As shown in FIG. 3, the signal converter 28 includes a resolution converter 60, a CMYK color converter 62, and a halftone processor 64.

An image signal input to the signal converter 28, i.e., an input image signal, represents multi-gradation data in a plurality of color channels. For example, the input image signal may be represented by 8-bit RGB TIFF data capable of expressing 256 gradations per pixel.

The resolution converter 60 converts the resolution of the input image signal into an output resolution, which depends on the image forming apparatus 14, according to an image scaling process for enlarging or reducing an image size. The resolution converter 60 generates a first intermediate image signal representing the output resolution. The first intermediate image signal represents data, which are defined in the same manner as the input image signal, but having a data size that differs from the input image signal. The image scaling process may be based on any of various known algorithms, including interpolation.

The CMYK color converter 62 converts the first intermediate image signal acquired from the resolution converter 60 into a second intermediate image signal, i.e., a device color signal that can be handled by the image forming apparatus 14. The second intermediate image signal corresponds to a multi-gradation CMYK color signal.

The halftone processor 64 converts the second intermediate image signal acquired from the CMYK color converter 62 into a control signal, which is supplied to the head unit 22 (see FIGS. 1 and 5) in order to control the head unit 22 to propel and eject inks 24. The control signal represents binary data or multi-valued data for each of the colors C, M, Y, K, for controlling the head unit 22 in a time sequence to selectively propel inks 24 from the head unit 22 and to stop propelling inks 24 from the head unit 22.

The image forming apparatus 14 also includes a signal processing condition storage unit 66 for storing a plurality of signal processing conditions that can be dealt with by the halftone processor 64. In response to a print instruction from the image processing apparatus 12, the signal processing condition storage unit 66 supplies a selected processing condition to the halftone processor 64 depending on an input image signal on which a halftone process is to be carried out.

The halftone process may be based on an ordered dithering process, an error diffusion process, a density pattern process, a random dot process, or the like. An ordered dithering process, which uses a threshold matrix, will be described below.

Figure 4:
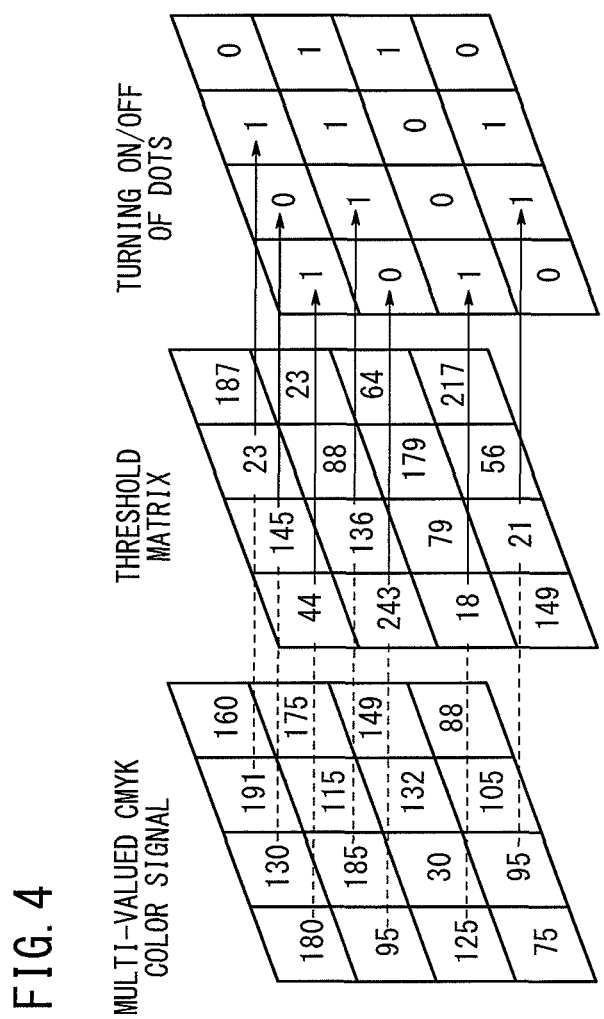
FIG. 4 is a diagram showing a halftone process according to an ordered dithering process.

FIG. 4 is a diagram showing a halftone process according to an ordered dithering process. FIG. 4 illustrates the concept of a binarizing process using a Bayer-pattern threshold matrix. Addresses of a multi-valued CMYK color signal are associated with respective elements in rows and columns of the threshold matrix. The magnitude of a pixel value of a pixel of interest is compared with the threshold value of a corresponding element of the threshold matrix. If the pixel value is greater than the threshold value, then "1 (ON)" is assigned to the pixel value. Otherwise, "0 (OFF)" is assigned to the pixel value. In this manner, the gradation level of the image signal is converted from a multi-valued level into a binary level.

The head driver 30 controls the head unit 22 to propel and eject inks 24 based on the control signal acquired from the halftone processor 64 of the signal converter 28.

Figure 5:
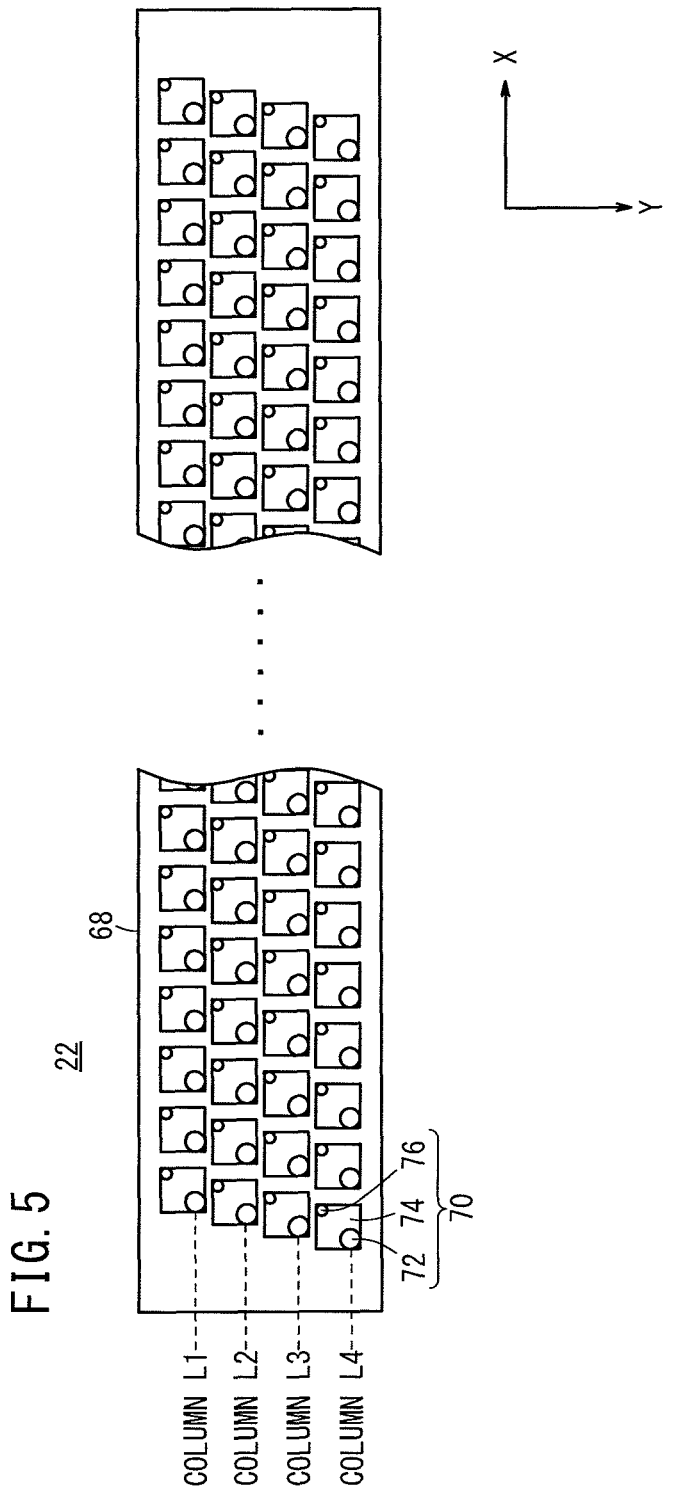
FIG. 5 is a fragmentary plan view showing a structural example of a head unit shown in FIG. 1.

FIG. 5 is a fragmentary plan view showing a structural example of the head unit 22. As shown in FIG. 5, the head unit 22 includes a plurality of line heads (dot generators) 68 in at least basic colors, i.e., Y (yellow), M (magenta), C (cyan), and K (black). Each of the line heads 68 extends along the direction in which the sheet 20 is fed, i.e., in the direction of the arrow Y.

The line heads 68 have a plurality of ink chamber units (dot generating elements) 70 arranged in a staggered matrix. Each of the ink chamber units 70 has a nozzle 72, a pressure chamber 74, and a supply port 76. The pressure chamber 74, which is of a generally square shape as viewed in plan, includes an outlet port defined in one of diagonally opposite corners thereof and which is connected to the nozzle 72, and an inlet port, serving as the supply port 76, which is connected to a common ink channel, not shown.

The layout of the nozzles 72 of the line heads 68 will be described below. An assembly of line heads 68 has a longitudinal direction, which is defined as the direction indicated by the arrow X (main direction), and a transverse direction, which is defined as the direction indicated by the arrow Y (auxiliary direction). The direction in which the sheet 20 is fed extends across the direction of the arrow X and is parallel to the direction of the arrow Y.

The nozzles 72 are arranged in successive columns L1 through L4, which extend parallel to the direction of the arrow X. The nozzles 72 in column L1 are spaced at equal intervals, each representing four unit lengths, along the direction of the arrow X. Similarly, the nozzles 72 in columns L2 through L4 are spaced at equal intervals, each representing four unit lengths, along the direction of the arrow X. The direction of the arrow X may also be referred to below as an "array direction" of the nozzles 72 or the ink chamber units 70.

The nozzles 72 in column L2 are positionally shifted to the left by one unit length from the nozzles 72 in column L1, opposite to the direction of the arrow X. The nozzles 72 in column L3 are positionally shifted to the left by one unit length from the nozzles 72 in column L2, opposite to the direction of the arrow X. The nozzles 72 in column L4 are positionally shifted to the left by one unit length from the nozzles 72 in column L3, opposite to the direction of the arrow X. Thus, the nozzles 72 in rows L1 through L4 are staggered such that the nozzles 72, which are projected onto a plane and arrayed along the longitudinal direction of the assembly of line heads 68, are apparently spaced at reduced intervals (projected nozzle pitches), resulting in a high-density nozzle layout.

Figure 6:
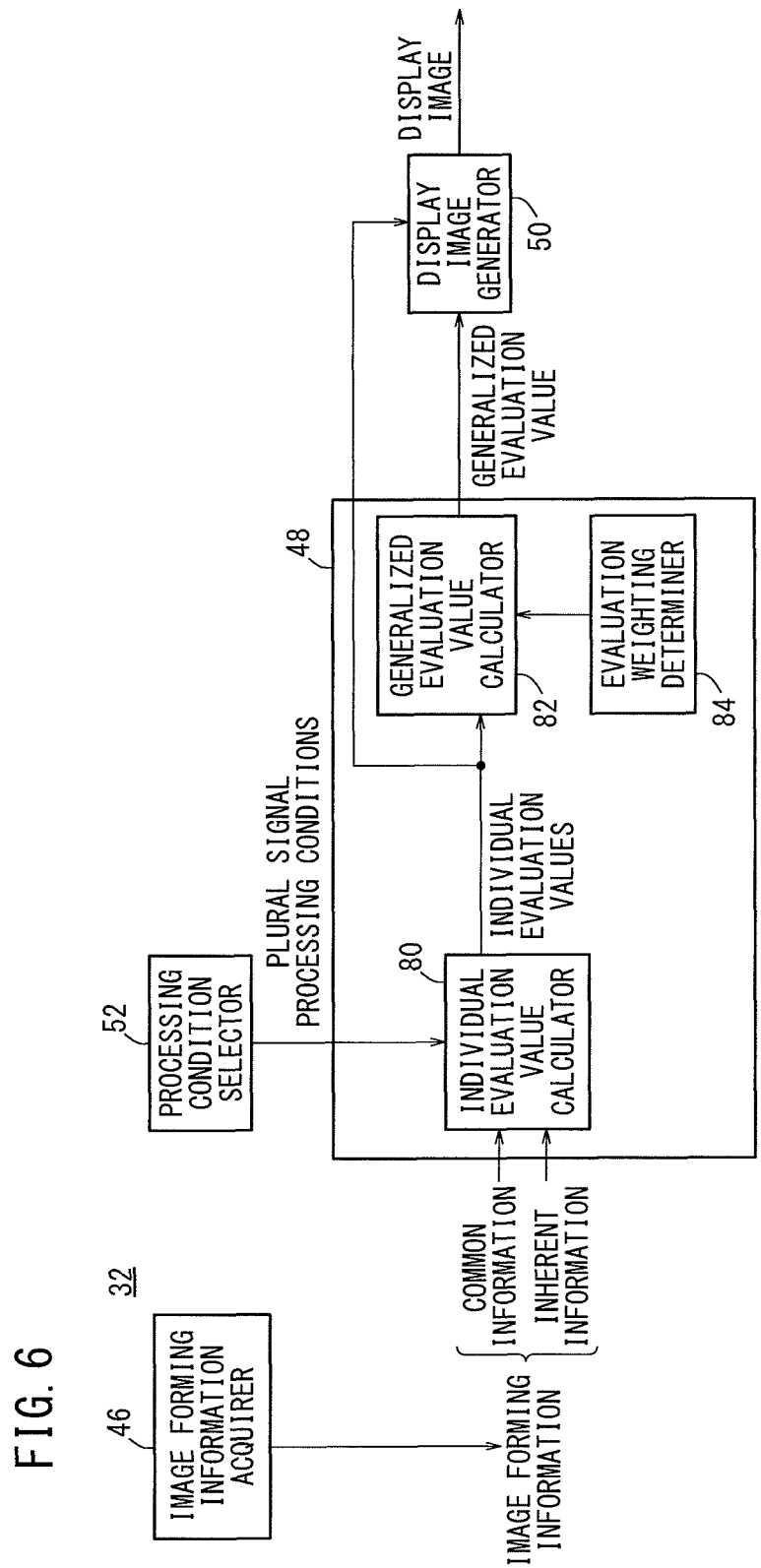
FIG. 6 is a functional block diagram of a controller shown in FIG. 2.

FIG. 6 is a functional block diagram of the controller 32 shown in FIG. 2.

As shown in FIG. 6, the production aptitude evaluator 48 includes an individual evaluation value calculator 80 for calculating individual evaluation values of the print 26 under prescribed signal processing conditions, a generalized evaluation value calculator 82 for calculating a generalized evaluation value in order to evaluate the production aptitude of the print 26 by weighting the individual evaluation values calculated by the individual evaluation value calculator 80 and adding the weighted individual evaluation values, and an evaluation weighting determiner 84 for determining weighting values, which are used by the generalized evaluation value calculator 82 to calculate the generalized evaluation value, for the respective individual evaluation values. The production aptitude evaluator 48 and other components, including the image forming information acquirer 46, the display image generator 50, and the processing condition selector 52, exchange data therebetween, as described later.

The image processing apparatus 12 according to the present embodiment is basically constructed as described above. Operations of the image processing apparatus 12 will be described below primarily with reference to the flowchart shown in FIG. 7 and the functional block diagram shown in FIG. 6.

First, in step S1, the image forming information acquirer 46 acquires image forming information. Prior to the acquisition of various items of information, the image processing apparatus 12 receives via the first interface 36 an image signal representing an image to be formed. The image processing apparatus 12 receives an image signal in one of two possible modes described below.

In one mode, as shown in FIG. 1, the DTP apparatus 16 rasterizes an electronic manuscript in PDL format, which has been generated according to a prescribed editing process, thereby generating a device color signal, e.g., an RGB color signal. The image processing apparatus 12 receives the device color signal supplied from the DTP apparatus 16 via the first interface 36.

In another mode, the DTP apparatus 16 generates an electronic manuscript in PDL format according to a prescribed editing process, and supplies the generated PDL electronic manuscript to the image processing apparatus 12. Thereafter, the image processor 44 (see FIG. 2) reads an ICC profile stored in the memory 34, and rasterizes the supplied PDL electronic manuscript, thereby generating a device color signal, e.g., an RGB color signal.

The image forming information acquirer 46 then acquires image forming information (common information and/or inherent information) associated with the input image signal. The image forming information acquirer 46 may acquire common information or inherent information from the database server 18, in which there has already been registered common information or inherent information, or may acquire inherent information from the image forming apparatus 14.

Then, in step S2, the processing condition selector 52 extracts a plurality of candidates for signal processing conditions, i.e., candidate processing conditions, which can be handled by the image forming apparatus 14. The processing condition selector 52 may acquire candidate processing conditions from the image forming apparatus 14 via the second interface 38. Alternatively, the processing condition selector 52 may check the database server 18, and acquire candidate processing conditions from the database server 18.

Then, in step S3, the production aptitude evaluator 48 begins evaluating the production aptitude of the print 26. In step S4, the production aptitude evaluator 48 judges whether or not evaluation of the production aptitude has been completed for all the candidate processing conditions extracted in step S2.

If the production aptitude evaluator 48 decides that evaluation of the production aptitude has not been completed, then in step S5, the individual evaluation value calculator 80 calculates individual evaluation values of the print 26 under another candidate processing condition that has not yet been evaluated. The individual evaluation values include, for example, graininess, sharpness, mottle (spotted pattern), striped irregularity (shading difference caused by errors in position where ink droplets are applied to the sheet 20), banding (shading differences caused by feeding the sheet 20), gradation, average density (density uniformity), the total amount of inks 24, the printing amount per unit time, the time required for performing halftone processing, etc. The individual evaluation value calculator 80 supplies the calculated individual evaluation values to the generalized evaluation value calculator 82 and to the display image generator 50.

In step S6, the generalized evaluation value calculator 82 calculates a generalized evaluation value from the supplied individual evaluation values. Prior to calculating the generalized evaluation value, the evaluation weighting determiner 84 determines weighting values, to be used by the generalized evaluation value calculator 82, for the respective individual evaluation values. For example, if priority is given, i.e., if importance is attached, to "graininess", then the evaluation weighting determiner 84 makes the weighting value for the individual evaluation value concerning "graininess" to be greater than the weighting value for the individual evaluation value concerning "striped irregularity". If priority is given, i.e., if importance is attached, to "ink amount", then the evaluation weighting determiner 84 makes the weighting value for the individual evaluation value concerning "total amount of inks 24" to be greater than the weighting value for the individual evaluation value concerning "image quality" (graininess, gradation, or the like).

The generalized evaluation value calculator 82 calculates a generalized evaluation value under the candidate processing conditions according to the weighting values determined by the evaluation weighting determiner 84, and supplies the calculated generalized evaluation value to the display image generator 50.

Thereafter, control returns to step S4. Steps S4 through S6 are repeated until individual evaluation values and generalized evaluation values under all of the candidate processing conditions have been calculated. If the production aptitude evaluator 48 decides that evaluation of the production aptitude has been completed in step S4, then control proceeds to step S7, and the production aptitude evaluator 48 finishes the process of evaluating the production aptitude of the print 26.

In step S8, the display image generator 50 generates a result display screen 100, which is displayed on the display unit 42, using the individual evaluation values calculated in step S5, and the generalized evaluation values calculated in step S6.

In step S9, the display controller 40 controls the display unit 42 to display the result display screen 100.

FIG. 8 is a view of a display image, i.e., the result display screen 100, displayed on the display unit 42, visually representing the evaluated production aptitude of the print 26.

As shown in FIG. 8, the result display screen 100 includes an information display field 102 for displaying image forming information, a first result display field 104 for displaying individual evaluation values of the print 26 under the signal processing conditions, a first selection menu (first selector) 106 for manually selecting and entering signal processing conditions, a selection method entering menu 108 for entering a method for selecting signal processing conditions, a second selection menu (second selector) 110 for entering and editing printing modes for the image forming apparatus 14, a second result display field 112 for visually displaying a generalized evaluation value of the print 26 under the presently selected signal processing condition, and a button 114 labeled "SET".

The information display field 102 displays the types of inks 24, the type of sheet 20, the output resolution of the image forming apparatus 14, and the attribute of the input image signal.

The first result display field 104 displays individual evaluation values concerning "image quality", "cost", and "productivity". The individual evaluation values concerning "image quality" represent individual evaluation values, ranging from a highest point 5 to a lowest point 1, with respect to graininess, mottle, striped irregularity, banding, gradation, and average density. The individual evaluation values concerning "cost" represent amounts of inks used relative to a reference amount of inks (=1) under signal processing conditions for a minimum total amount of inks 24. The individual evaluation values concerning "productivity" represent the length of the print 26 that is fed per minute (m/min).

The first selector 106 includes a plurality of candidate processing conditions (halftone titles A through N) provided as toggle options, which are selectable one at a time. In FIG. 8, the halftone title "B" is chosen.

The selection method entering menu 108 includes two toggle options, i.e., a manual entering method for manually entering one of the candidate processing conditions, and a mode entering method for automatically selecting suitable signal processing conditions depending on an entered mode. In FIG. 8, the mode entering method is chosen.

The second selector 110 includes four modes, i.e., a graininess-oriented mode, a striped-irregularity-oriented mode, an ink-amount-oriented mode, and productivity-oriented modes, which are provided as toggle options that are selectable one at a time. In FIG. 8, the graininess-oriented mode is chosen. In response to an input signal for a mode change from the UI 56, the evaluation weighting determiner 84 changes weighting values used for the generalized evaluation value calculator 82, so as to calculate a generalized evaluation value each time that a mode change is made. A frame area corresponding to the signal processing condition (the halftone title "B" in FIG. 8), which maximizes the generalized evaluation value, is colored in order to clearly indicate the signal processing condition as a recommended signal processing condition. Therefore, it is easy for the operator to select an optimum halftone process.

The second selector 110 can edit and add a further mode, e.g., a gradation-oriented mode, to the above four modes, according to a request from the operator.

The second result display field 112 displays, on the left side, a first radar chart made up of individual evaluation items concerning image quality. The second result display field 112 also displays, on the right side, a second radar chart made up of the production aptitude, i.e., a so-called QCD (quality-cost-delivery) characteristic of the print 26.

The operator clicks desired check boxes of the first selector 106, the selection method entering menu 108, and the second selector 110 on the result display screen 100, so as to select signal processing conditions one-by-one in order to grasp the production aptitude of the print 26. In this manner, the operator selects an optimum signal processing condition for producing the print 26. Then, the operator clicks the button 114 to set the selected signal processing conditions.

The processing condition selector 52 confirms whether or not an instruction for selecting a signal processing condition has been received via the UI 56 in step S10. More specifically, the processing condition selector 52 judges whether or not the button 114 has been clicked.

If the button 114 is not clicked, then control returns to step S9, in which the display controller 40 repeatedly controls the display unit 42 to display the result display screen 100. If the button 114 is clicked, then control proceeds to step S11.

In step S11, the processing condition selector 52 determines the signal processing condition instructed in step S10 as the selected signal processing condition. The controller 32 stores the selected signal processing condition in the memory 34 in association with the input image signal and the image forming apparatus 14.

Finally, in step S12, the image forming apparatus 14 forms an image on the sheet 20 according to the input image signal, thereby producing the print 26. More specifically, in response to a printing instruction from the operator, the image forming apparatus 14 receives the input image signal and the selected processing condition from the image processing apparatus 12. Based on the input image signal and the selected processing condition, the signal converter 28 generates a control signal, which is supplied to the head driver 30 in order to control the head unit 22 to propel and eject ink droplets onto the sheet 20, based on the control signal from the signal converter 28.

Figure 9A:
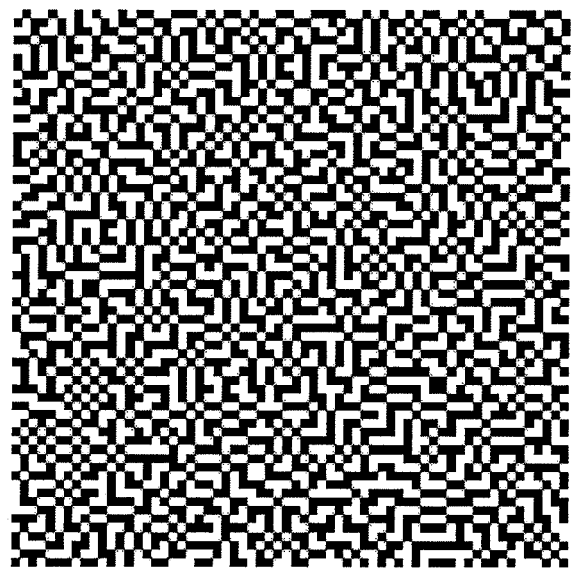
FIGS. 9A and 9B are diagrams visually showing image data representing dot patterns.

If the operator selects the graininess-oriented mode using the second selector 110, then a dot pattern, the gradation level of which is approximately 50% as shown in FIG. 9A, is generated. The dot pattern shown in FIG. 9A has dots placed substantially isotropically. With noise (spectrum) increased in a high spatial frequency range, the dot pattern is less grained (less noisy) as perceived by human vision.

Figure 9B:
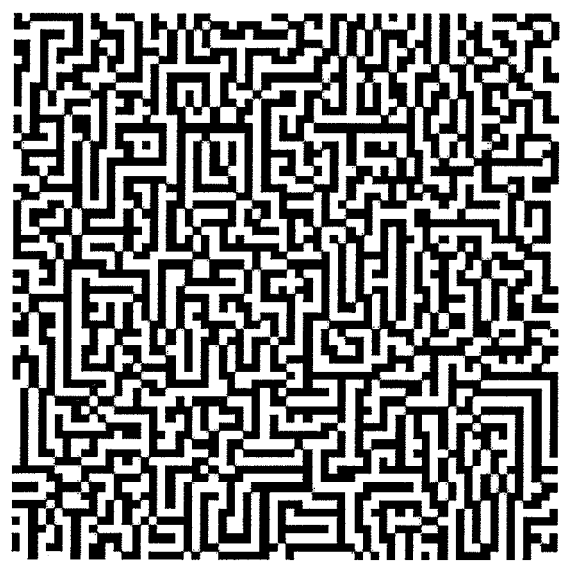

If the operator selects the striped-irregularity-oriented mode using the second selector 110, then a dot pattern, the gradation level of which is approximately 50% as shown in FIG. 9B, is generated. Compared to the dot pattern shown in FIG. 9A, the dot pattern shown in FIG. 9B contains more dots interconnected along the row direction, i.e., along the direction of the arrow Y in FIG. 5. If an image is formed using the line heads 68 (see FIG. 5) in the striped-irregularity-oriented mode, the image becomes more robust against striped irregularities along the direction in which the sheet 20 is fed, i.e., the direction of the arrow Y.

As described above, the production aptitude of the print 26 under various signal processing conditions is evaluated based on the image forming information of the print 26 and the prescribed evaluation criteria, and the result display screen 100 visually representing the evaluated production aptitude is generated and displayed. Consequently, even if the operator is not well aware of the processing characteristics of available halftone processes, the operator can easily grasp the processing characteristics of available halftone processes and can select one of the halftone processes which is suitable for the print 26, simply by observing the result display screen 100 (the first result display field 104 and the second result display field 112).

A modification of the image processing apparatus 12 according to the present embodiment will be described below with reference to FIGS. 10 through 13. Parts of the modification, which are identical to those of the image processing apparatus 12 according to the present embodiment, are denoted by identical reference characters, and such features will not be described in detail below.

Figure 10:
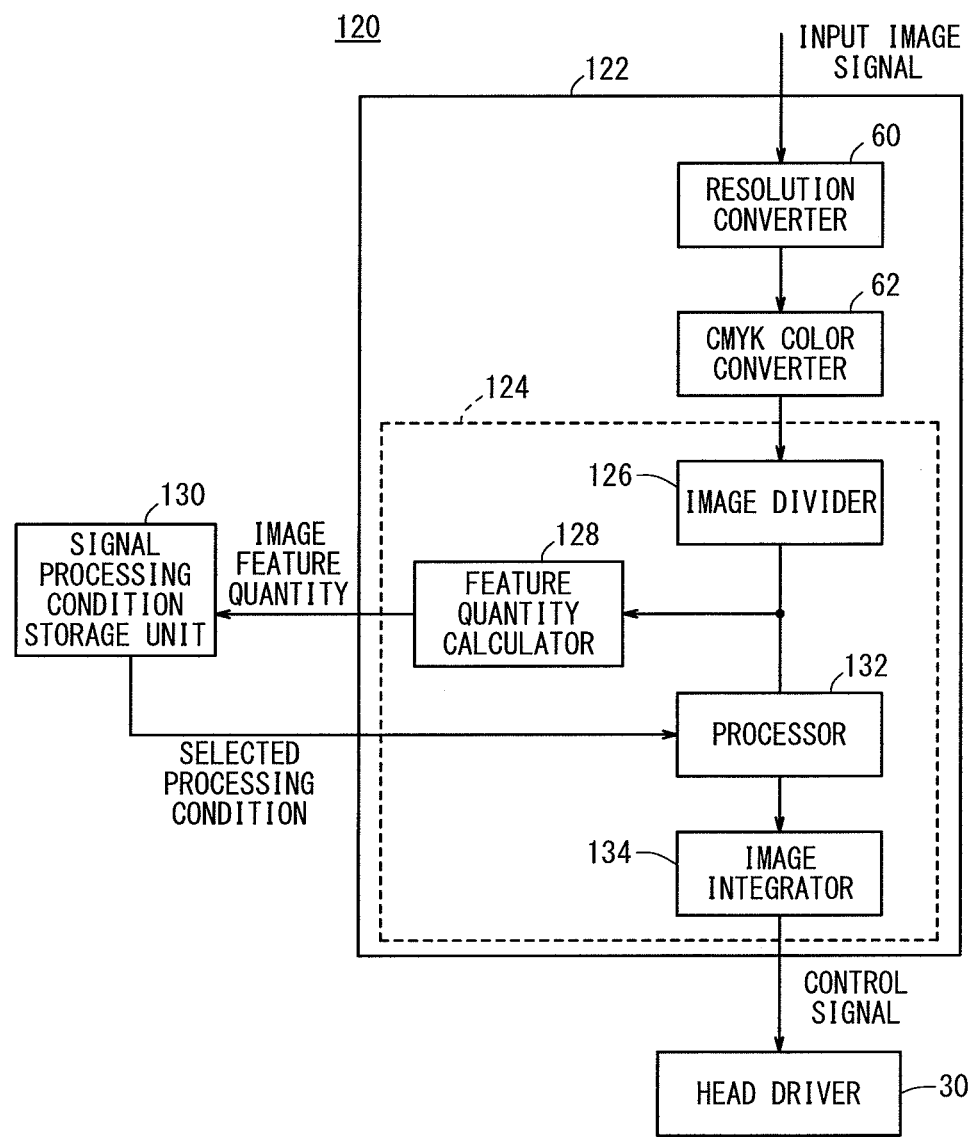
FIG. 10 is a block diagram showing another signal processing flow in the signal converter shown in FIG. 1.

A modified image forming apparatus 120 (see FIG. 10) is capable of switching between halftone processes for each of auxiliary areas of an image area. FIG. 10 is a block diagram showing another signal processing flow that is carried out in the signal converter 122 shown in FIG. 1.

The signal converter 122 includes, in addition to the resolution converter 60 and the CMYK color converter 62, a halftone processor 124, which functions differently than the halftone processor 64 shown in FIG. 3.

The halftone processor 124 includes an image divider 126 for dividing a single image area into a plurality of auxiliary areas, a feature quantity calculator 128 for calculating an image feature quantity in each of the auxiliary areas produced by the image divider 126, a processor 132 for performing a halftone process on each of the auxiliary areas according to a selected processing condition supplied from a signal processing condition storage unit 130, and an image integrator 134 for integrating control signals generated by the processor 132 that correspond to the respective auxiliary areas.

The image divider 126 divides a single image area into a desired number of image areas having desired area sizes. For example, the image divider 126 may divide a single image area into image areas corresponding to respective blocks or objects.

The feature quantity calculator 128 is supplied with an image signal representative of auxiliary areas, and outputs image feature quantities associated with respective signal processing conditions. The feature quantity calculator 128 may employ any of various input/output models, e.g., a Monte Carlo method, a neural network, a boosting algorithm, a genetic algorithm, etc. If the feature quantity calculator 128 is intended to calculate image feature quantities based on a learning model such as a neural network or the like, in particular, then it is necessary for the feature quantity calculator 128 to study test data.

Figure 11:
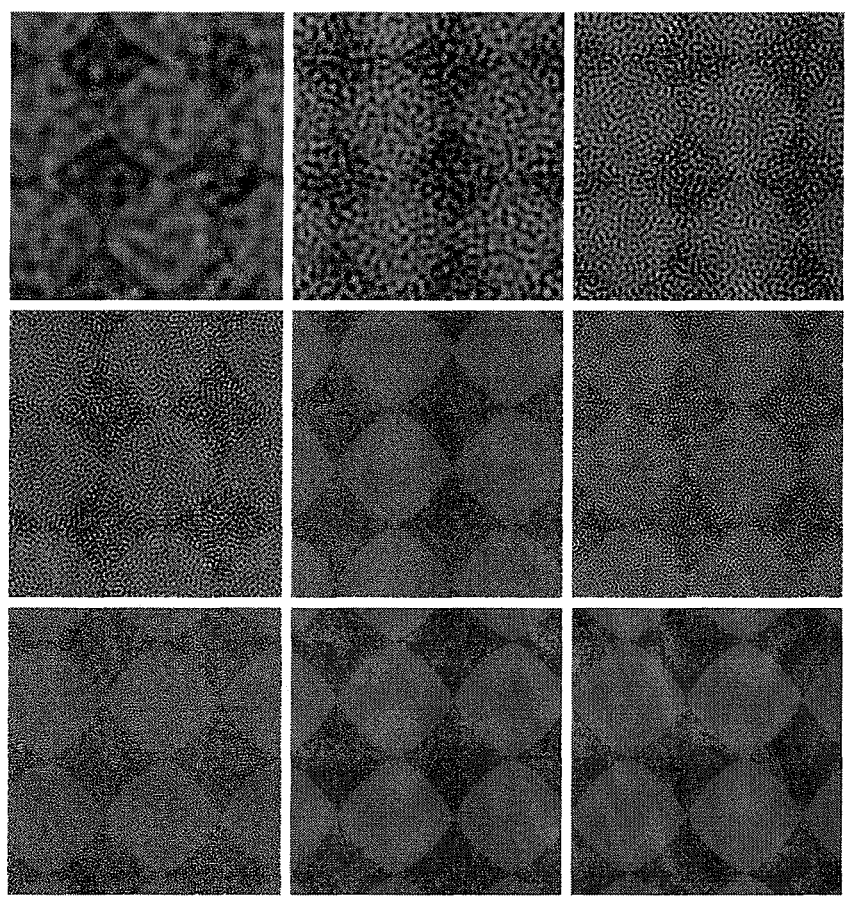
FIG. 11 is a diagram showing an example of learning patterns in a feature quantity calculator.

As shown in FIG. 11, the feature quantity calculator 128 employs a plurality of combinatorial data (test data) of image patterns representing feature patterns (hereinafter referred to as "learning patterns") and image feature quantities corresponding to signal processing conditions suitable for such learning patterns. Of the nine learning patterns shown in FIG. 11, the learning patterns on the right-hand side have greater spectral components in a lower spatial frequency range, and the spectral patterns on the left-hand side have greater spectral components in a higher spatial frequency range. The learning patterns on the upper side have a lower grayscale contrast, and the learning patterns on the lower side have a higher grayscale contrast. Using the learning patterns, which are substantially isotropic two-dimensionally, the feature quantity calculator 128 is capable of producing image feature quantities depending on graininess.

Figure 12:
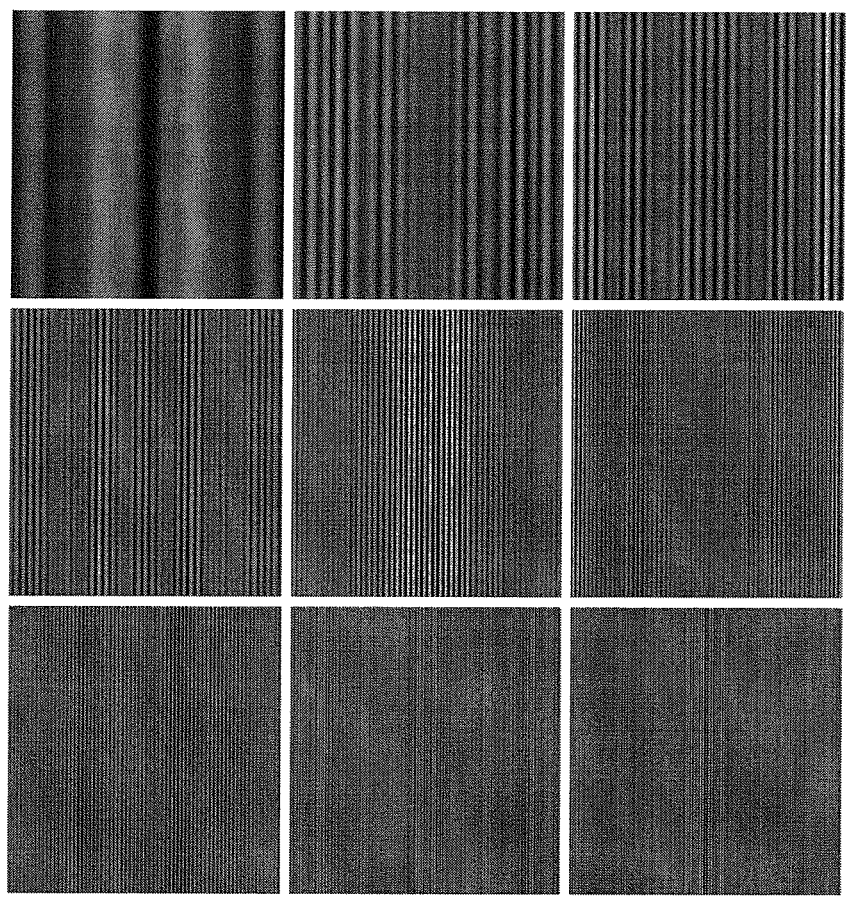
FIG. 12 is a diagram showing another example of learning patterns in the feature quantity calculator.

As shown in FIG. 12, the feature quantity calculator 128 may employ anisotropic learning patterns including vertically extending thin lines. Using such anisotropic learning patterns including vertically extending thin lines, the feature quantity calculator 128 can produce image feature quantities depending on sharpness in the direction of the arrow X, i.e., the direction along which the assembly of line heads 68 extends. The feature quantity calculator 128 may alternatively employ anisotropic learning patterns including horizontally extending thin lines. Using such anisotropic learning patterns including horizontally extending thin lines, the feature quantity calculator 128 can produce image feature quantities depending on sharpness in the direction of the arrow Y.

As shown in FIG. 10, the signal processing condition storage unit 130 selects one of the signal processing conditions stored therein based on image feature quantities calculated by the feature quantity calculator 128. The processor 132 performs a halftone process on second intermediate image signals representing the auxiliary areas according to the selected processing condition, thereby producing control signals for the respective auxiliary areas. The image integrator 134 integrates the control signals, which correspond to the respective auxiliary areas produced by the image divider 126, thereby generating a control signal for a seamless image area.

Figure 13:
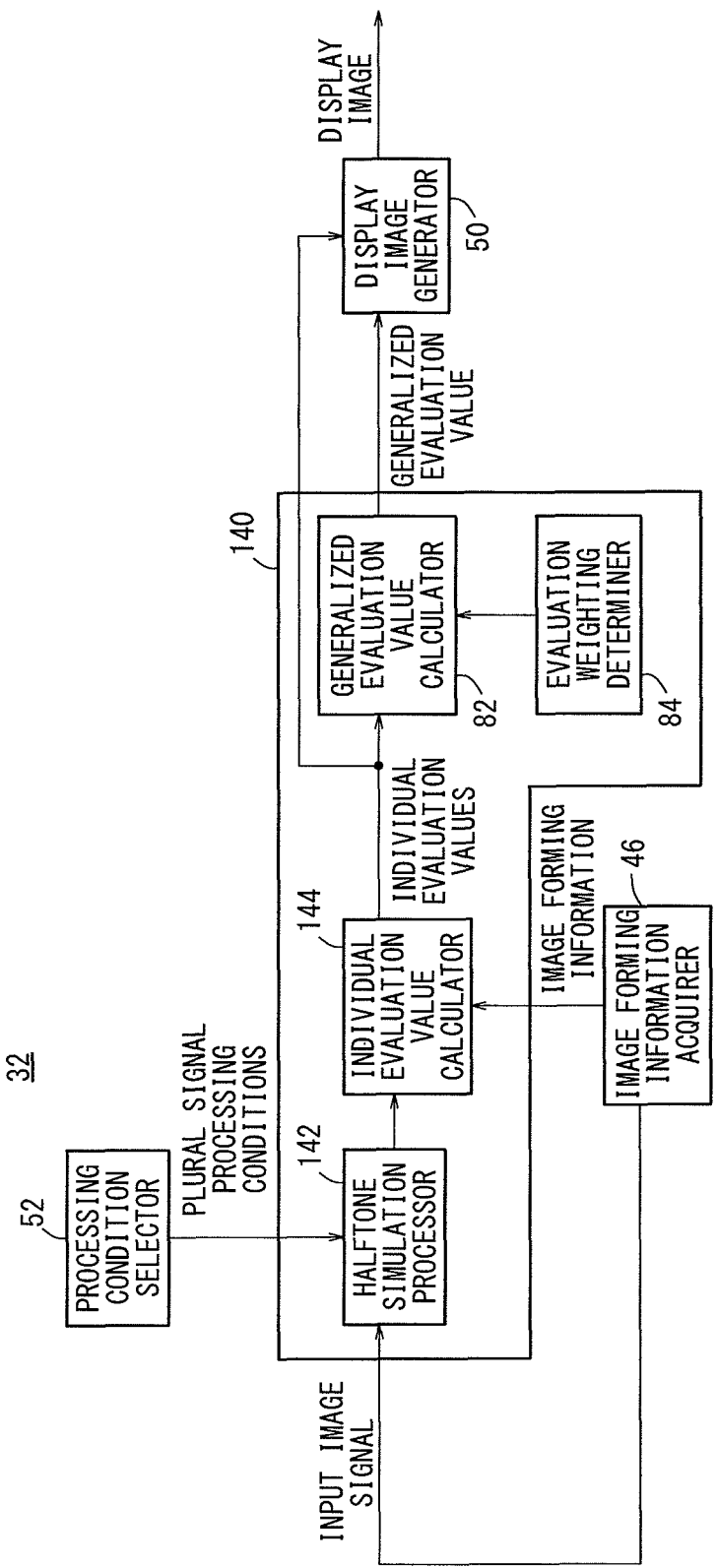
FIG. 13 is a functional block diagram of a controller according to a modification.

FIG. 13 is a functional block diagram of a controller 32 according to a modification. As shown in FIG. 13, the modified controller 32 includes a production aptitude evaluator 140, which differs from the production aptitude evaluator 48 shown in FIGS. 2 and 6, in that the production aptitude evaluator 140 evaluates the production aptitude of the print 26 after simulating the halftone process carried out by the image forming apparatus 120.

Figure 7:
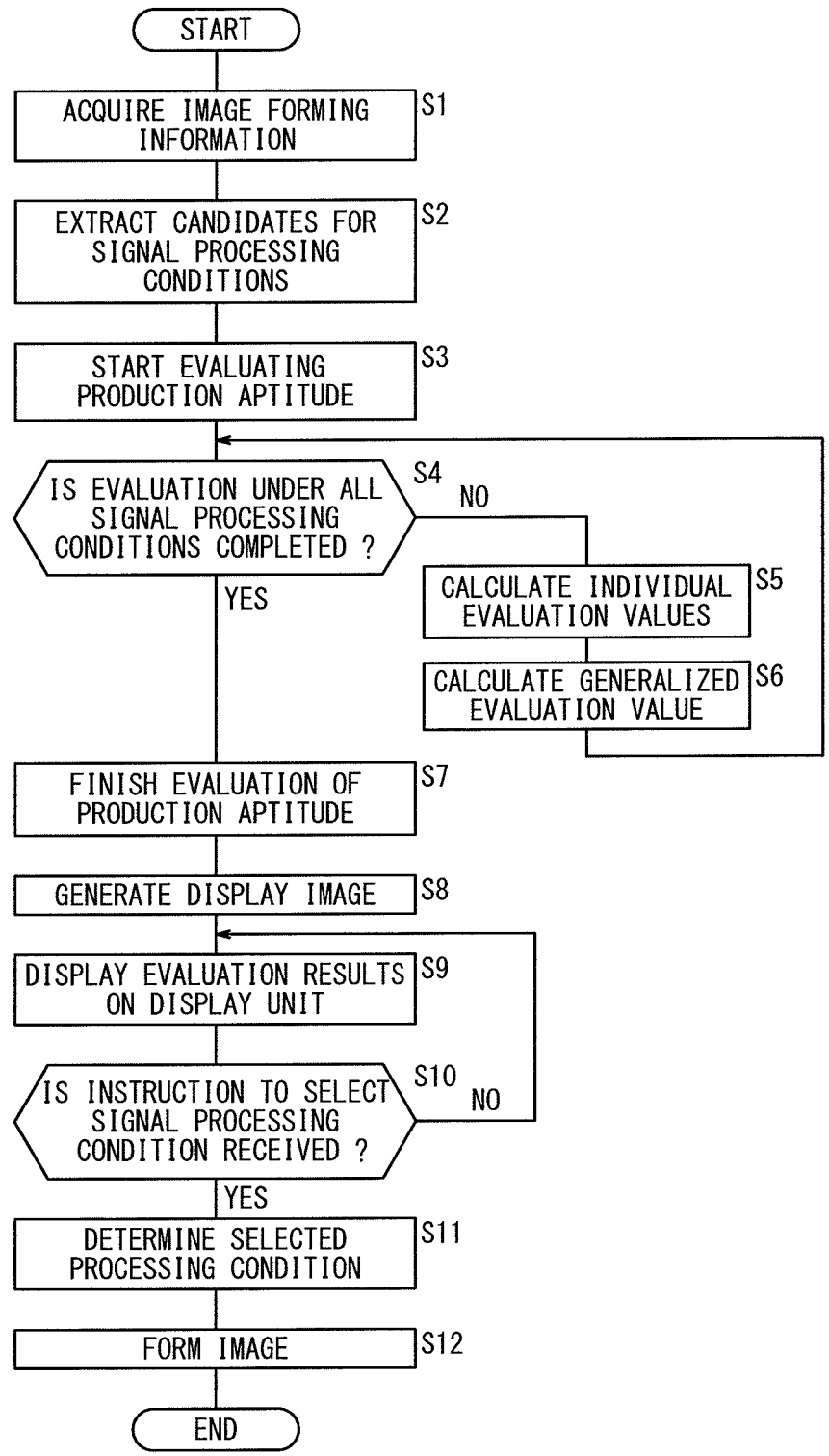
FIG. 7 is a flowchart of an operation sequence of the image processing apparatus shown in FIG. 1.

The modified controller 32 operates basically in the same sequence as the flowchart shown in FIG. 7 (steps S3, S4, and S6 through S8), except for step S5 for calculating individual evaluation values.

The production aptitude evaluator 140 includes, in addition to the generalized evaluation value calculator 82 and the evaluation weighting determiner 84, a halftone simulation processor 142, which has the same function as the aforementioned halftone processor 124 (see FIG. 10), and an individual evaluation value calculator 144 for calculating individual evaluation values of the print 26 based on an image signal produced by the halftone simulation processor 142 and image forming information.

The halftone simulation processor 142 converts the input image signal from the image forming information acquirer 46 into an image signal (hereinafter referred to as an "evaluation image signal") for evaluating the production aptitude of the print 26 under a given signal processing condition from the processing condition selector 52. The halftone simulation processor 142 may perform a processing sequence for essentially reproducing the results of the process carried out by the halftone processor 124 (see FIG. 10), or may perform a simplified processing sequence assuming that a suitable correlation to the production aptitude of the print 26 is sufficiently maintained.

The individual evaluation value calculator 144 calculates individual evaluation values of the print 26 under prescribed signal processing conditions, using the evaluation image signal generated by the halftone simulation processor 142, together with the image forming information from the image forming information acquirer 46. The individual evaluation value calculator 144 may calculate individual evaluation values from an overall image area represented by the evaluation image signal, or may calculate individual evaluation values for respective auxiliary areas or objects.

The modified controller 32 offers the same advantages as the controller 32 according to the above embodiment by simulating the halftone process of the image forming apparatus 120 with the image processing apparatus 12, and by calculating individual evaluation values according to the simulated halftone process.

In the above embodiment, four color plates in colors of C, M, Y, K have mainly been described. However, the principles of the present invention also are applicable to other desired types of color plates and any desired number of color plates. For example, standard inks in colors of C, M, Y, K may be combined with optional inks in pale colors, such as LC, LM, or the like, and W (white).

The image forming apparatus 14 is not limited to an inkjet printer, but may be any type of printer capable of producing dots by applying color materials to a print medium, such as an electrophotographic printer or the like, for example.

Although certain preferred embodiments of the present invention have been shown and described in detail, it should be understood that various changes and modifications may be made to the embodiments without departing from the scope of the invention as set forth in the appended claims.

What is claimed is:

1. A processing condition selecting apparatus for selecting a single signal processing condition from a plurality of signal processing conditions representing different dot distribution characteristics, and instructing an image forming apparatus, which is capable of producing a print by forming an image on a recording medium, to carry out a halftone process depending on the selected signal processing condition, comprising:
   an image forming information acquirer for acquiring image forming information with respect to the print;
   a production aptitude evaluator for quantitatively evaluating a production aptitude of the print under the signal processing condition, based on the image forming information acquired by the image forming information acquirer and prescribed evaluation criteria; and
   a display image generator for generating a display image visually representing the production aptitude of the print that has been quantitatively evaluated by the production aptitude evaluator.

2. The processing condition selecting apparatus according to claim 1, wherein the prescribed evaluation criteria comprise a plurality of individual evaluation items including an evaluation item concerning at least one of the quality of the print, the cost required to produce the print, and the time required to produce the print.

3. The processing condition selecting apparatus according to claim 2, wherein the production aptitude evaluator comprises:
   an individual evaluation value calculator for calculating individual evaluation values of the print under the signal processing conditions based on the image forming information and the individual evaluation values; and
   a generalized evaluation value calculator for calculating a generalized evaluation value to evaluate the production aptitude of the print by weighting the individual evaluation values calculated by the individual evaluation value calculator, and adding the weighted individual evaluation values.

4. The processing condition selecting apparatus according to claim 3, wherein the display image generator generates the display image to indicate, as a recommended signal processing condition, a signal processing condition that maximizes the generalized evaluation value calculated by the generalized evaluation value calculator.

5. The processing condition selecting apparatus according to claim 3, wherein the display image generator generates the display image to include a radar chart image concerning the individual evaluation values.

6. The processing condition selecting apparatus according to claim 3, wherein the production aptitude evaluator further comprises an evaluation weighting determiner for determining weighting values for the respective individual evaluation values, which are used by the generalized evaluation value calculator in order to calculate the generalized evaluation value.

7. The processing condition selecting apparatus according to claim 6, wherein the evaluation weighting determiner determines the weighting values in response to an input signal from a user interface.

8. The processing condition selecting apparatus according to claim 1, further comprising a processing condition selector for selecting the single signal processing condition from the plurality of signal processing conditions.

9. The processing condition selecting apparatus according to claim 1, further comprising a display unit for displaying the display image generated by the display image generator.

10. A processing condition selecting method for selecting a single signal processing condition from a plurality of signal processing conditions representing different dot distribution characteristics, and for instructing an image forming apparatus, which is capable of producing a print by forming an image on a recording medium, to carry out a halftone process depending on the selected signal processing condition, the method comprising the steps of:
    acquiring image forming information with respect to the print;
    quantitatively evaluating a production aptitude of the print under the signal processing condition, based on the acquired image forming information and prescribed evaluation criteria; and
    generating a display image visually representing the production aptitude of the print that has been quantitatively evaluated.

11. A non-transitory storage medium storing therein a program for selecting a single signal processing condition from a plurality of signal processing conditions representing different dot distribution characteristics, and for instructing an image forming apparatus, which is capable of producing a print by forming an image on a recording medium, to carry out a halftone process depending on the selected signal processing condition, the program enabling a computer to function as:
    an image forming information acquirer for acquiring image forming information with respect to the print;
    a production aptitude evaluator for quantitatively evaluating a production aptitude of the print under the signal processing condition, based on the image forming information acquired by the image forming information acquirer and prescribed evaluation criteria; and
    a display image generator for generating a display image visually representing the production aptitude of the print that has been quantitatively evaluated by the production aptitude evaluator.

* * * * *